(12) United States Patent
Gronland et al.

(10) Patent No.: US 7,137,244 B2
(45) Date of Patent: Nov. 21, 2006

(54) REACTOR FOR DECOMPOSITION OF AMMONIUM DINITRAMIDE-BASED LIQUID MONOPROPELLANTS AND PROCESS FOR THE DECOMPOSITION

(75) Inventors: Tor-Arne Gronland, Sollentuna (SE); Bjorn Westerberg, Södertälje (SE); Goran Bergman, Nykvarn (SE); Kjell Anflo, Haninge (SE); Jesper Brandt, Falsterbo (SE); Ola Lyckfeldt, Goteborg (SE); Johan Agrell, Taby (SE); Anders Ersson, Bromma (SE); Sven Jaras, Taby (SE); Magali Boutonnet, Taby (SE); Niklas Wingborg, Stockholm (SE)

(73) Assignee: Svenska Rymdaktiebolaget, Solna (SE)

( * ) Notice: Subject to any disclaimer, the term of this patent is extended or adjusted under 35 U.S.C. 154(b) by 107 days.

(21) Appl. No.: 10/478,478

(22) PCT Filed: May 23, 2002

(86) PCT No.: PCT/SE02/00992

§ 371 (c)(1),
(2), (4) Date: Jun. 7, 2004

(87) PCT Pub. No.: WO02/095207

PCT Pub. Date: Nov. 28, 2002

(65) Prior Publication Data

US 2005/0014641 A1    Jan. 20, 2005

(30) Foreign Application Priority Data

| May 23, 2001 | (SE) | ................................. 0101847 |
| May 23, 2001 | (SE) | ................................. 0101852 |
| May 28, 2001 | (SE) | ................................. 0101751 |

(51) Int. Cl.
*F02K 9/42* (2006.01)
*F02K 9/95* (2006.01)
*C06D 5/08* (2006.01)
*B01J 23/10* (2006.01)

(52) U.S. Cl. ............................ 60/257; 60/258; 60/260; 422/198

(58) Field of Classification Search ................ 60/257, 60/258, 259, 39.462, 260; 422/198, 226
See application file for complete search history.

(56) References Cited

U.S. PATENT DOCUMENTS

| 3,303,651 A | * | 2/1967 | Grant, Jr. et al. .......... 60/203.1 |
| 4,162,292 A | * | 7/1979 | Speeds et al. ........... 60/39.462 |
| 4,802,333 A | * | 2/1989 | Smith ......................... 60/260 |
| 5,485,722 A | * | 1/1996 | Schmidt et al. ............... 60/219 |

FOREIGN PATENT DOCUMENTS

| EP | 0950648 A1 | * | 10/1999 |
| WO | WO 01/09063 |   | 2/2001 |

* cited by examiner

*Primary Examiner*—Ted Kim
(74) *Attorney, Agent, or Firm*—Browdy and Neimark, PLLC

(57) ABSTRACT

The present invention relates to a reactor for the decomposition of ammonium dinitramide-based liquid monopropellants into hot, combustible gases for combustion in a combustion chamber, and more particularly a rocket engine or thruster comprising such reactor and a combustion chamber. The invention also relates to a process for the decompostion of ammonium dinitramide-based liquid monopropellants.

23 Claims, 5 Drawing Sheets

REACTOR FOR DECOMPOSITION OF AMMONIUM DINITRAMIDE-BASED LIQUID MONOPROPELLANTS AND PROCESS FOR THE DECOMPOSITION

FIELD OF THE INVENTION

The present invention relates to a reactor for the decomposition of ammonium dinitramide-based liquid monopropellants into hot, combustible gases for combustion in a combustion chamber, and more particularly a rocket engine or thruster comprising such reactor and a combustion chamber. The invention also relates to a process for the decomposition of ammonium dinitramide-based liquid monopropellants.

BACKGROUND ART

In space applications, such as rockets, satellites and other space vehicles, liquid propellant thrusters and rocket engines are often used. Such thrusters and rocket engines can for example be used for the purpose of positioning and attitude control of satellites and other space vehicles. For such purposes attitude control thrusters operating in the thrust range of typically 0.5–50 N, or Δ-V rocket engines typically operating in the thrust range of 1 N to several kN. Attitude control thrusters are required to perform short pulses or pulse trains, the duration of which typically can be fractions of seconds to several minutes.

Liquid propellants can be divided into monopropellants and bipropellants. The former consists of one component, while the latter consists of two components, i.e. a liquid oxidiser and a liquid fuel. The distinction between monopropellants a bipropellants is made according to the number of components which are injected into the engine for combustion for the specific propellant.

In the case of a monopropellant, which may be a mixture of several compounds or one single chemical, only one component is injected into the engine.

Currently, hydrazine is about the only liquid monopropellant widely used for generation of hot gases. In the case of hydrazine the decomposition pathway occurs in two stages; first hydrazine is catalytically decomposed into hydrogen and ammonia in an exothermal reaction, and thereafter ammonia further decomposes into hydrogen and nitrogen in an endothermal reaction due to the high temperature generated in the first stage. The second stage endothermal reaction will reduce the flame temperature and reduce the specific impulse. It is therefore desirable to limit the ammonia dissociation as much as possible. When the ammonia dissociation is held to 55%, the adiabatic reaction temperature will be ca. 900° C.

In a bipropellant engine, fuel and oxidizer liquids are injected, atomised and mixed in a first zone of the combustion chamber. In the case of a hypergolic bipropellant, such as hydrazine and nitrogen tetroxide, there is an initial chemical reaction in the liquid phase when a droplet of fuel impinges with a droplet of oxidiser. Bipropellants which are not hypergolic use some type of ignitor to initiate the chemical combustion. In a bipropellant system using hydrogen peroxide as the oxidiser, a catalyst may be used.

Liquid bipropellants generally offer higher specific impulse than liquid monopropellants. Bipropellant systems are thus more efficient than monopropellant systems, but tend to be more complicated because of the extra hardware components needed to make sure the proper amount of fuel is mixed with the proper amount of oxidiser.

Liquid monopropellants, based on a dinitramide compound, and especially ammonium dinitramide (ADN), have recently been developed, and are disclosed in WO0050363. These propellants are novel High Performance Monopropellants, which generate extremely high temperatures at proper combustion thereof. Such monopropellant comprises at least two components; a dinitramide compound (oxidiser) and a fuel. An additional solvent component may also be included, such as water.

These new monopropellants, including at least two components, have been described to generate a very high temperature on combustion, such as about 1700° C. As the propellant may also include water, very high demands will be put on a suitable engine or thruster for such a fuel, consequently excluding all known monopropellant thrusters as suitable alternatives.

Thus, it is an object of the present invention to provide a reactor for decomposition and combustion of liquid ammonium dinitramide-based monopropellants.

It is a further object of the present invention to provide a process for decomposition ammonium dinitramide-based monopropellants, such as for rocket propulsion and for controlled gas generation for any other purpose, such as rotary power in auxiliary power units.

Other objects and advantages of the present invention will become evident from the following description, examples, and the attached claims.

The terms rocket engine and thruster will be used interchangeably herein to designate the portion of a liquid propellant rocket engine, in which the propellant is injected, extending downstream to the nozzle.

SUMMARY OF THE INVENTION

The present inventors have investigated the decomposition pathway of ammonium dinitramide-based liquid monopropellants and found a pathway that corresponds to observed temperatures at different stages of decomposition. Consequently, it has been found that the combustion of a ammonium dinitramide-based liquid monopropellant can be divided into a series of steps, including i.a. the decomposition of the ammonium dinitramide oxidiser which eventually generates free oxygen.

In a final stage, combustible components generated from thermal and catalytic decomposition will be oxidised in a homogenous gas combustion by the free oxygen thus generated. This combustion requires no catalysis.

Thus, the ammonium dinitramide-based monopropellant can be regarded as being decomposed into a bipropellant, which is combusted in a final step or steps, during which the maximum temperature is reached.

It has also been found that for the desired decomposition of the ammonium dinitramide oxidiser to take place, catalytic activity is required until the homogenous gas combustion. In practice, this will mean that catalytic activity will be required up to a temperature of at least 1000° C. As will be discussed in greater detail below, catalytic activity, especially in the aft portion of the catalyst, may be required may at higher temperatures, depending on the specific monopropellant.

Thus, a key to this goal is the development of a suitable high-temperature catalyst. Such catalyst has now been found by the present inventors and will be described in detail below.

The inventors have also developed a reactor for the decomposition of ammonium dinitramide-based liquid monopropellants, and a thruster incorporating the reactor. Such reactor and thruster will be described in detail below.

The reactor could also be used for generating hot gases at high pressure for driving a turbine, vane motor, or piston motor.

BRIEF DESCRIPTION OF THE ATTACHED DRAWINGS

FIG. 1 shows adiabatic temperatures after the first reaction steps during decomposition of an ammonium dinitramide-based monopropellant containing glycerol as the fuel, and after complete combustion. The initial temperature is 20° C. 30% of the AN is assumed to decompose to nitrogen and nitrogen dioxide.

FIG. 2, same as in FIG. 1, but with methanol as the fuel.

FIG. 3A illustrates a reactor, and 3B a rocket engine of the invention comprising the inventive reactor, wherein 5 is a hollow body, 10 propellant feed pipe, 20 injector, 25 heat bed, 30 catalyst bed containing catalyst pellets 35, 40 is a retainer, 50 combustion chamber and 60 is a heat and chemically resistant liner.

DETAILED DESCRIPTION OF THE INVENTION

Figure 1:
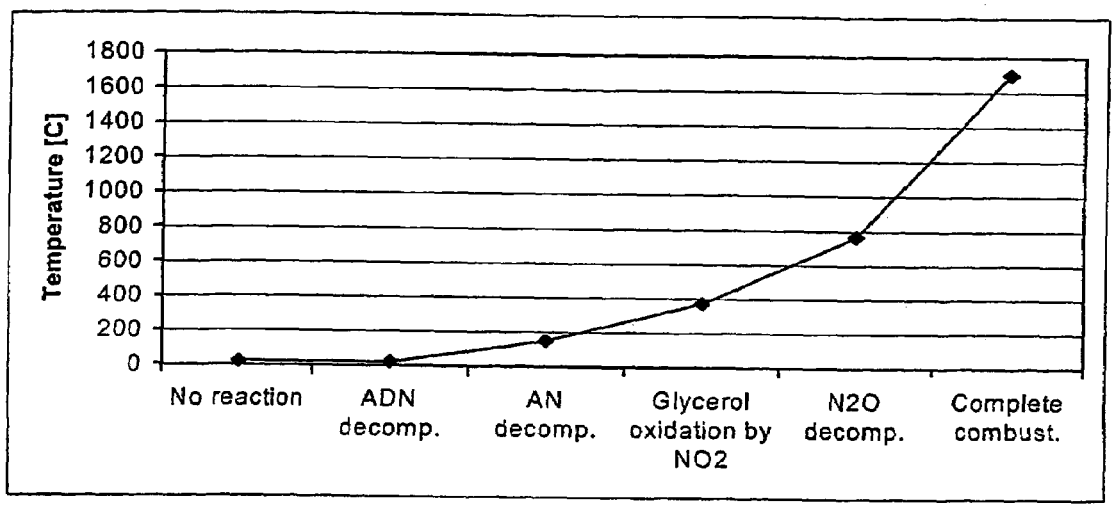

While not wishing to be bound to any theory, the following reaction scheme is believed to be descriptive of the general reactions governing the decomposition of an ammonium dinitramide-based monopropellant.

The conversion of the propellant starts with the decomposition of the oxidising agent, ADN, and is followed by the combustion of the fuel component. The initial step is the decomposition of ADN. ADN undergoes thermal decomposition to ammonium nitrate (AN) and nitrous oxide (1):

$$NH_4N(NO_2)_2 \rightarrow NH_4NO_3 + N_2O \quad \Delta H = -136 \text{ kJ/mol} \quad (1)$$

The formed AN thermally decomposes either to nitrous oxide and water (2), or to nitrogen, nitrogen dioxide and water (3):

$$NH_4NO_3 \rightarrow N_2O + 2H_2O \quad \Delta H = -37 \text{ kJ/mol} \quad (2)$$

$$NH_4NO_3 \rightarrow \tfrac{3}{4}N_2 + \tfrac{1}{2}NO_2 + 2H_2O \quad \Delta H = -102 \text{ kJ/mol} \quad (3)$$

For thermal decomposition, the formed amount of nitrogen and nitrogen dioxide decreases with temperature (26% $N_2$ at 290° C. and 6% $N_2$ at 340° C.) [J. C. Oxley, J. L. Smith, W. Zheng, E. Rogers, M. D. Coburn, *J. Phys. Chem.* A 101 (1997) 5646]. Nitrogen dioxide is a very reactive oxidiser and reacts with the fuel component, such as for example glycerol (generally represented by R—$CH_2OH$ in reaction (4) below):

$$R{-}CH_2OH + NO_2 \rightarrow R{-}COOH + \tfrac{1}{2}N_2 + H_2O \quad \Delta H \approx -470 \text{ kJ/mol} \quad (4)$$

When all AN and nitrogen dioxide are consumed, the remaining oxidiser is in the form of nitrous oxide. Nitrous oxide is decomposed to nitrogen and oxygen:

$$N_2O \rightarrow N_2 + \tfrac{1}{2}O_2 \quad \Delta H = -82 \text{ kJ/mol} \quad (5)$$

The released oxygen reacts to complete combustion of the remaining glycerol and the partially oxidised glycerol. In FIG. 1 the adiabatic temperatures after the first four steps and after complete combustion are shown. The initial temperature is 20° C. The heat released during ADN decomposition to AN is less than the heat required to vaporise the water and the glycerol. The adiabatic temperature after AN decomposition depends on the extent the decomposition following reaction 2 or 3. If 30% of the AN decomposes to nitrogen and nitrogen dioxide (reaction 3) the adiabatic temperature becomes 147° C. If a larger part of the AN decomposes via this route the adiabatic temperature will be higher. When the formed nitrogen dioxide reacts with glycerol the adiabatic temperature increases to 371° C. and decomposition of the nitrous oxide raises the adiabatic temperature to 765° C. The adiabatic temperature for complete combustion is 1700° C.

The change of fuel component in the monopropellant does not influence the first three reaction steps. Accordingly, when the fuel is methanol, the fourth step applies with the difference that it is now a specific reaction instead of a generalised reaction, i.e. methanol oxidation to formic acid by $NO_2$ (as shown in reaction 6 below) instead of alcohol oxidation to carboxylic acid by $NO_2$. This means that the reaction heat is also specified.

$$CH_3OH + NO_2 \rightarrow HCOOH + \tfrac{1}{2}N_2 + H_2O \quad \Delta H = -461 \text{ kJ/mol} \quad (6)$$

Reaction step five also applies without change. The last steps where the released oxygen reacts with the remaining methanol and the formed formic acid may also be specified:

$$CH_3H + O_2 \rightarrow HCOOH + H_2O \quad \Delta H = -428 \text{ kJ/mol} \quad (7)$$

$$HCOOH + \tfrac{1}{2}O_2 \rightarrow CO_2 + H_2O \quad \Delta H = -248 \text{ kJ/mol} \quad (8)$$

Figure 2:
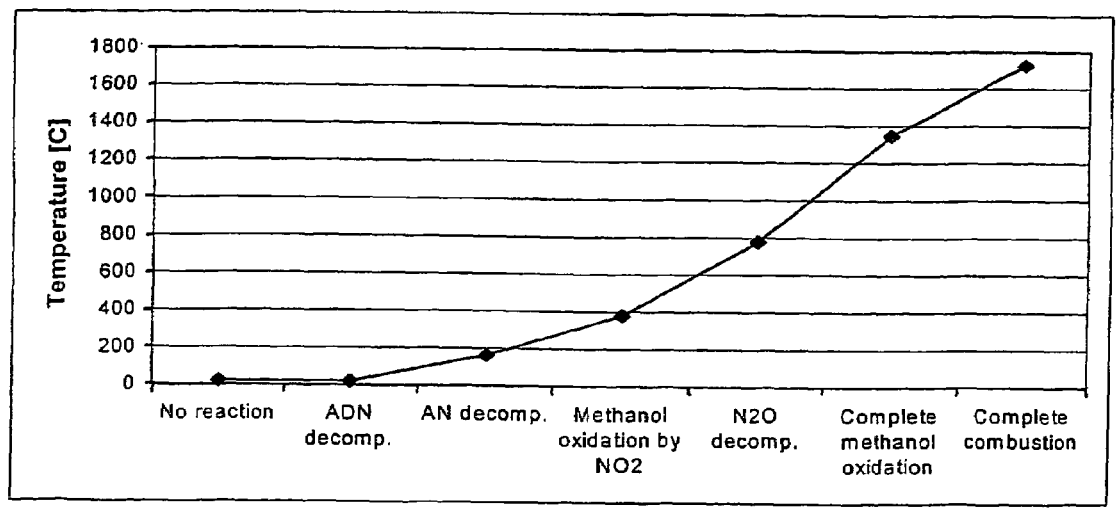

In FIG. 2 the adiabatic temperatures after each successive step and after complete combustion are shown. The temperatures after the first steps are similar to the temperatures obtained for the glycerol containing propellant. The small differences are due to difference in the heat capacity for the fuel component and its reaction product. The heat released during ADN decomposition to AN is still less than the heat required to vaporise the water and the methanol. With reference to FIG. 2, and with the same conditions as for the glycerol containing propellant above, the adiabatic temperature after AN decomposition becomes 162° C., and when the formed nitrogen dioxide reacts with methanol the adiabatic temperature increases to 379° C. Decomposition of the nitrous oxide raises the adiabatic temperature to 778° C. and after complete oxidation of methanol to formic acid the temperature is 1345° C. The adiabatic temperature for complete combustion is 1725° C.

The above suggested reaction schemes are in well agreement with temperatures measured at different locations along the reactor of a small thrusters during operation.

According to the above reaction scheme, the net formula for the overall reaction of the monopropellant composition LMP103 can be described as:

$$94H_2O + 33NH_4N(NO_2)_2 + 22CH_3OH \rightarrow 22CO_2 + 204H_2O + 66N_2$$

For same composition, minus the water, the corresponding net formula is:

$$3NH_4N(NO_2)_2 + 2CH_3OH \rightarrow 2CO_2 + 10H_2O + 6N_2$$

With reference to FIGS. 1 and 2, the combustion stage where no further catalysis is required occurs shortly after the $N_2O$ decomposition in the respective diagram, and is in practice believed to occur at 1000–1200° C., depending on the specific propellant.

Reaction Kinetics and Consequences for Reactor Design

The ADN decomposition is thermally activated and consequently takes place in the heat bed if the temperature is high enough. The activation energy for ADN in solution has been determined to 155 kJ/mol, and 167 kJ/mol for neat AND (J. C. Oxley et al.). Ammonium nitrate (AN) decomposition has a lower activation energy (90 kJ/mol according to S. Vyazovkin, J. S. Clawson, C. A. Wight, *Chem. Mat.* 13 (2001) 960) and consequently the ADN decomposition is immediately followed by the decomposition of AN to $H_2O$, $N_2O$, $N_2$ and $NO_2$. As no further reaction takes place before the decomposition of ADN has started, the condition for a proper ignition is that this reaction reaches a sufficient rate. This is obtained if the heat bed has a sufficiently high temperature. An alternative is to catalyse the decomposition in the catalyst bed. However, if the system is operated that way a problem may arise when running long pulses. During long pulses the heat bed will be cooled down and eventually not all of the liquid will be evaporated before the fluid enters the catalyst bed When liquid enters the porous catalyst bed it causes desintegration of the catalyst pellets and hence degradation of the catalyst bed. This may be prevented if the complete or the major part of the propellant conversion takes place a sufficiently short distance into the catalyst bed so that the heat conducted upstream to the heat bed is sufficient to keep the evaporation process inside the heat bed. However, this requires that the catalyst activity is high enough in the beginning of the catalyst bed and that the activity does not degrade significantly with time. Another alternative is to use a catalytic heat bed. If the heat bed is covered with a material active for ADN decomposition sufficient ADN conversion rate will be reached at a lower temperature.

Feasible catalyst candidates for ADN decomposition contain Cr, Co, Mn, Cu or combinations thereof. These metals are known to catalyse the decomposition of ammonium nitrate (D. E. Petrakis, A. T. Sdoukos, P. J. Pomonis, *Thermoch Acta* 196 (1992) 447). It is required that the catalyst material is not dissolved when the reaction proceed. As the environment inside the heat bed can be very aggressive (some of the reaction intermediates are $NO_2$ and also $HNO_3$ formed from $NO_2$ and water), it is reasonable to choose Cr, Mn or a combination. These candidates will stay insoluble if the oxidation state does not reach the highest ones for these metals. Due to the aggressive and oxidising environment it may however be necessary to use other candidates or combinations with other candidates, that are more durable, but not as active for ADN decomposition. Such candidates are Ir, Pt and Rh.

The Reactor

The reactor of the invention can for example form part of a rocket engine or thruster.

Figure 3A:
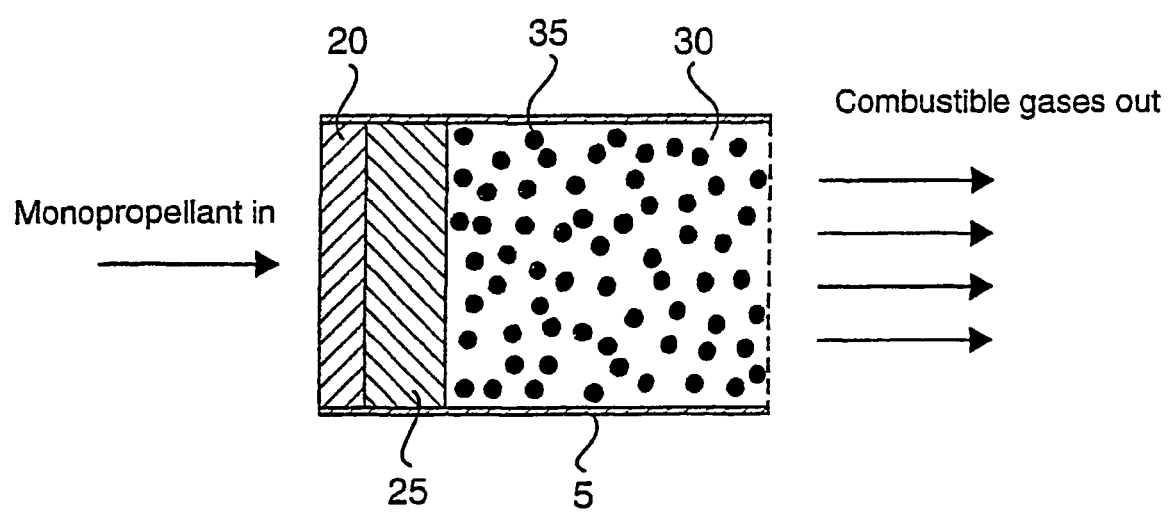

In its most general embodiment and with reference to FIG. 3A, the reactor of the invention comprises a hollow body 5 provided with, from the upstream end;

an injector 20;

a heat bed 25; and a catalyst bed 30 of porous catalyst pellets 35 which are heat and sintering resistant to a temperature of at least 1000° C., wherein the injector is formed so to be able to distribute the liquid propellant over the heat bed, the overall void volume is essentially formed of the porosity of the heat bed and catalyst bed, and wherein the hollow body is thermally conductive and the heat bed is in indirect thermal contact with the catalyst bed via the hollow body.

Figure 3B:
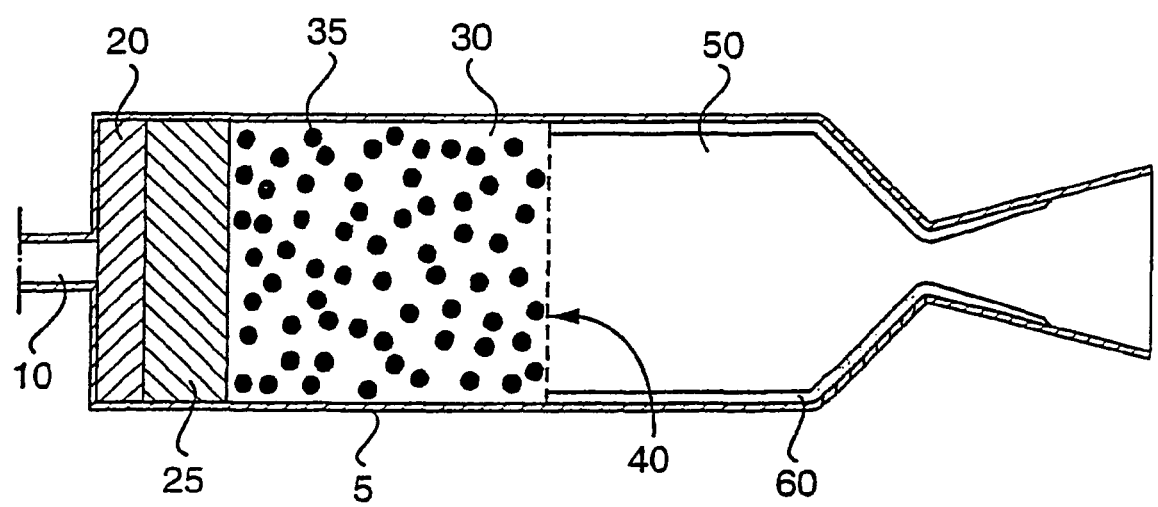

In the case of a rocket engine, the reactor forms part of the engine as shown in FIG. 3B. For simplicity, any conventionally used parts which are attached to a rocket engine, such as the upstream parts; propellant pump, propellant valve and thermal standoff, etc, as well as a heater for heating the heat bed (as conventionally used for heating the catalyst bed in the case of a hydrazine engine) and thermal standoff for the heater, have been excluded from the Figure. The skilled person will immediately recognise which further parts are required for the rocket engine, having read this disclosure. Accordingly, the hollow body confining the reactor is the hollow body of the engine, into which body the propellant is injected and combusted. Thus, there is a combustion chamber downstream of the reactor, for combustion the combustible components generated by the reactor.

Components of the Reactor

The present inventors have surprisingly found the specific type of injector to be of great significance for the proper function of the reactor. Accordingly, the function of the present injector is to merely distribute the propellant over the heat bed, i.e. no atomisation is required or desired. The injector should be free of any undesired void volumes in which pools of propellant could accumulate. Such pools could otherwise cause "hard starts" which are severely detrimental to a rocket engine and its components. The injector can be separate from the heat bed and be positioned placed immediately upstream of the heat bed. A porous disc injector (for distribution only) has been found to perform the intended function, and is presently preferred. Alternatively, the injector can also be made integral with the heat bed. In this case, the upstream portion of the heat bed could be formed for effectively performing the function of distributing the propellant over the integral downstream portion of the heat bed.

The heat bed is provided in order to vaporise the propellant before entering into the catalyst bed. The heat bed must exhibit sufficient heat capacity in order to vaporise a sufficient portion of the propellant being fed into the bed during start and before heat is being transferred upstream to the bed, as will be described in more detail below. The heat bed must also exhibit a sufficient thermal conductivity in order to be able to dissipate heat throughout the bed, which heat partly will be transferred from downstream to the bed via the walls. This heat it then transferred to the propellant flowing through the bed. Furthermore, the material of the bed must be able to withstand any detrimental impact from components generated on decomposition of ADN in the bed, such as nitric acid. Accordingly, the material of the heat should be acid resistant, and can for example be in the form of a metal mesh.

The high temperature catalyst pellets used in the catalyst bed of the reactor must exhibit a sufficient surface area for the desired catalytic function to be performed. The pressure drop over the catalyst bed must not be unduly high, since this would cause pressure oscillations and wear of the engine. It is therefore preferred that the catalyst pellets are porous. The required surface area of the catalyst should also be maintained for a sufficiently long period of time of operation of the engine using the catalyst, when the catalyst is exposed to the relevant gaseous species, such as water vapour, at a temperature of at least 1000° C. In practise, this means that the catalyst must be sintering resistant at these temperatures.

The catalyst should preferably also be dimensionally stable. It is also preferred that the catalyst maintain sufficient catalytic activity to perform its intended function even after exposure to 1200° C., preferably 1400° C., and more preferably even after exposure to 1700° C.

In order to obtain the desired sintering resistance, the catalyst pellets are thermally stabilised at the expected temperature in an atmosphere of the relevant gaseous species. During this treatment some surface area of the material will necessarily be lost. Accordingly, it is required that the specific catalyst material used is such that it will maintain sufficient surface area after this treatment The treatment will also prevent any undesired shrinkage of the catalyst pellets, when subjected up to said expected temperature in the reactor.

With reference to FIGS. 1 and 2, in an ideal catalyst, a heat gradient roughly corresponding to the temperature at AN decomposition to the temperature at $N_2O$ would be established in the catalyst bed. The downstream portion of the catalyst will obviously be expected to be subjected to a higher temperature than the upstream portion, as is evident from FIGS. 1 and 2. Also, variations in monopropellants also tend to lead to variations in the expected temperature, and especially the downstream catalyst temperature, such as from 1000–1200° C.

Especially the downstream portion may also be subjected to even higher temperatures, e.g. due to transient undesired upstream shifting of the gradient, such as up to 1400° C., or even 1700° C.

For these reasons and for the obtaining of margins in operational performance, such as the life time of the reactor and engine, it is preferred that the downstream portion is sintering resistant up to 1200° C., preferably up to 1400° C., more preferably up to 1700° C.

By only stabilising the downstream portion of the catalytic bed to such higher temperatures, a larger catalytic surface area can be maintained in the upstream portion of the bed, where the requirements of catalytic surface are expected to be higher.

The high temperature resistant catalyst pellets contained in the catalyst bed are thus suitably formed of a refractory, ceramic, sintering resistant material, and the surface thereof is preferably provided with one or more suitable catalytically active metals, such as, Pt, Ru, Pd, Pt/Rh, Ir, Rh, Mn or Ir/Rh, more preferably Pt/Rh, Ir, Rh, or Ir/Rh, of which Pt/Rh presently is preferred. This can for example be obtained by impregnation of the pellets with the catalytic metal(s) by means of incipient wetness.

When the downstream portion of the catalytic bed is sintering resistant up to a higher temperature than the upstream bed, as described above, the catalytic metal of the upstream portion can be selected as described above, i.e. Pt/Rh is presently preferred, while the downstream portion of the bed preferably is provided with one or more suitable catalytically active metals, such as, Pt, Ru, Pd, Pt/Rh, Ir, Rh, Mn, or Ir/Rh, of which Ir and Mn presently are preferred.

While any known material fulfilling the above-mentioned requirement could be used as the catalyst, the number of known candidate materials are very limited. The catalyst support is preferably a sintering resistant alumina material, although other relatively inert metal or ceramic sintering resistant support materials could be used instead of, or in combination with, the alumina. The catalyst material is preferably nano-structured, i.e. the material is in the form of nanoparticles. More preferably the catalyst comprises a hexaaluminate material. Such catalyst will be described in more detail below.

The catalyst pellets can be formed by any suitable forming technique for forming porous pellets of a sintering resistant material. Spherical pellets are preferred, and should preferably exhibit an even surface.

As an example, the pellets can be formed of a slurry of the specific sintering resistant material and a consolidating agent. Suitable consolidating agents can for example be selected from starch (starch consolidation), protein (protein coagulation), and polymers (gel casting). The solvent used in the slurry can also function as consolidating agent, in which case the pellets are cooled for consolidation by freezing of the solvent. The slurry can then formed into pellets by any conventional forming technique. Thereafter, the pellets are treated (heated or cooled) for consolidation, and the consolidating agent is burned-out. Finally the pellets are sintered, preferably without the use of any mould, since any applied pressure could compromise the desired micro porous structure of the pellets, e.g. an open porous structure of 100–200 nm pore size. Preferably, the burn-out step is preceded by a drying step in order to prevent any rapid build-up of pressure due to vapours generated, which could cause mechanical damage to the pellets.

For the preparation of smooth spherical pellets of a diameter of from 0.2–5 mm the below method is preferred. Preferably, these pellets are made of a hexaaluminte material, as will be described below.

The catalyst bed is thus dimensioned so as to provide the required overall catalytic surface area, and such that the final combustion stage essentially will occur downstream the catalyst bed, i.e. in the combustion chamber, while at the same only offering an acceptable pressure drop across its length in the direction of the flow.

The catalyst bed is kept in place by a retainer. An example of a suitable retainer is a perforated plate of Ir or Ir supported by Re, as Ir is inert to the relevant combustion species.

Combustion chamber (first void volume of reactor). The walls of the reactor, including the combustion chamber, must be able to withstand the high temperatures generated during combustion of the propellant. They must also be resistant to any exhaust gases or intermediary decomposition products generated in the reactor. A suitable material is thus rhenium. In order to withstand the nitric gases generated in the final steps of the decomposition the combustion chamber portion of the walls are suitably lined with iridium.

The desired characteristic chamber length, L*, for ADN based liquid monopropellants is estimated to be approximately 0.5 to 2 m.

Any voids in the reactor chamber should be kept to a minimum in order to avoid hard starts, and undesired damage of reactor, primarily due to potential accumulation of liquid propellant in such voids. The only desired void volume is the combustion chamber. The remaining void volume of the reactor should be comprised of the pores and interstitial voids in the catalyst bed and voids in the heat bed.

Accordingly, it is preferred that the catalyst material be heat stabilised at the expected maximal catalyst temperature, before use in the catalyst bed. By doing so, any reduction of the catalyst bed volume during operation of the reactor is reduced to a minimum. More preferably, such stabilisation is performed at a temperature 50° C. above the expected maximum catalyst temperature.

Function of the Reactor and Process of Decomposition

The function of the reactor and its components will now be described in more detail with reference to a rocket engine (see FIG. 3B) incorporating the reactor.

Before starting the reactor the heat bed is pre-heated to a sufficient temperature presently demonstrated to be 280° C. and above. The reactor will start already with a heat bed temperature of 250° C., but in order to obtain a nominal start 280° C. is preferred. The power of the heating is usually only enough to heat the bed to a sufficient temperature within a reasonable time, such as 10 to 30 minutes. In the case of a small thruster of about 1 to 10 N, the power is typically less than 10 W. The fuel, usually at a temperature of 10–50° C., is then pressure fed into the heat bed. As the propellant enters the heat bed it propagates downstream through the pre-heated bed. The propellant fed into the bed will cool the bed down during its passage. The temperature and the heat accumulated in the bed will however be sufficient to vaporise a first portion of propellant fed into the bed. The vaporised portion will be followed by a boiling front moving down-stream through the bed as the temperature of the bed further downstream decreases. Without any further heating the bed would eventually reach the temperature of the propellant that is being fed into it. At the same time, and with reference to the reaction scheme outlined above, the heat from the heat bed will initiate decomposition of ADN contained in the monopropellant. As previously mentioned, although this reaction is exothermal, it is not believed to be enough itself to vaporise the propellant.

As the vaporised portion of the propellant enters the catalyst bed, a series of reaction step will follow, finally producing free oxygen that will oxidise the remaining fuel component and any combustible components produced in previous steps. The final step or steps comprising the combustion stage take place in the combustion chamber. The overall reaction taking place in the catalyst bed and combustion chamber is highly exothermal.

In order to avoid mechanical failure of the porous catalyst bodies due to evaporation induced disintegration thereof, it is crucial that enough heat is transferred upstream to the heat bed for the heat bed to be able to vaporise the fuel fed into the bed at such rate that the boiling front does not reach into the catalyst bed.

Preferably, also the dual phase flow consisting of liquid particles in vapour, between the moving boiling front (vapour in liquid) and the mono-phase gas flow, should not reach into the catalyst bed. Preferably, the catalyst bed should be dimensioned accordingly.

As the decomposition reactions progress in the catalyst bed and combustion chamber, the catalyst bed will obtain an increasingly higher temperature downstream. During combustion in the combustion chamber, heat will inevitably partly be lost to the surrounding walls. Heat from the catalyst bed will also partly be lost to the walls. A part of this heat is conducted upstream via the walls to the heat bed, which will receive and dissipate the heat throughout the heat bed. The heat bed will in turn transfer heat to the propellant being fed into the bed. Some heat will also be radiated from the catalyst bed and received by the heat bed.

Thus, the boiling front of the propellant being fed into the heat bed will initially advance downstream in the heat bed, and once the heat generating reactions are initiated in the catalyst bed and combustion zone, heat will be transferred upstream causing the boiling front to stop or be shifted upstream in the heat bed. After these start transients, the boiling front will reach a fairly stationary position within the heat bed, where heat transferred to the bed corresponds to the heat lost from the bed to the propellant passing through the bed.

In summary, the heat bed will vaporise the propellant, and, at the same time, initiate the decomposition of ADN, which, according to the proposed reaction scheme, is necessary in order to initiate the combustion of the fuel.

As previously mentioned, by including catalytic activity in the heat bed for the purpose of enhanced decomposition of ADN, it might be possible to reduce the required pre-heating temperature.

In the catalyst bed the temperature will increase in the downstream direction. As already mentioned, the bed should be dimensioned so that the combustion stage occurs in the combustion chamber. Should combustion occur in the catalyst bed due to any undesired unstable conditions, such as for example, during a cold or hard start, combustion may transiently be shifted into the aft portion of the catalyst bed, with the concomitant exposure of catalyst pellets in said aft portion to temperatures severely higher than the intended optimal operational temperature in the portion of the bed, such as about 1400° C. or even 1700° C.

Such exposure will decrease the catalytic activity of the pellets thus exposed. Mainly because of loss of the impregnated catalytically active metal from the surface of the pellets.

It has been found that by including a suitable dopant, such Mn, in the catalyst material, catalytic activity will be maintained as long as the catalyst material itself is not decomposed.

However, in the upstream end of the catalyst bed a reasonably high catalytic surface area is required for the reactions to take place at a sufficiently high rate. Accordingly, combustion should be prevented from occurring to far upstream into the catalyst bed, or catalytic activity might be lost, shifting the combustion to an undesirably aft position, or even leading to wash out of the engine during either of the following pulses.

With a suitable dopant in the catalyst material, and especially of the catalyst pellets have been dimensionally stabilised at 1400° C., the present inventors believe transiently occurring combustion temperatures in the aft 25% of the bed not to cause any serious damage to the engine.

Preferred Catalyst Material for the Reactor

The present inventors have found that most known catalyst support materials, when exposed to the thermal and chemical conditions generated on combustion of the ammonium dinitramide-based monopropellants disclosed in WO-0050363, will sinter at a rate which is too high for the material to be of practical value in a catalyst bed of the inventive rocket engine. By the sintering of the catalyst support material, the catalytic surface will be severely reduced, and the catalyst will finally not be able to perform its function any longer, and thus, the rocket engine will not operate properly, if at all. In order to reliably perform its function, it is important that the catalyst retain its intended surface area for a sufficiently long period of time of operation of the engine containing the inventive catalyst.

In a preferred embodiment the refractory, ceramic, sintering resistant material used for preparing the catalyst pellets is a ceramic powder prepared by the following method.

In its most general concept, the method is based on a microemulsion-assisted sol-gel technique, according to which method hexaaluminates, $AAl_{11}O_{18}$, wherein A is an alkaline earth or rare earth metal, having improved sintering resistance are prepared by adding a solution of an aluminium alkoxide to a water-in-oil microemulsion, the aqueous phase of which comprises a solution of a water soluble salt of A, whereafter the powder formed is recovered and calcined.

Accordingly, in this method, at least one of the components forming the powder is included in the water phase of the micro-emulsion.

It has been found that by including the alkaline earth or rare earth metal in the water phase of the micro-emulsion, improved compositional homogeneity of the powder formed is obtained, thus enabling crystallisation at a lower temperature, suppressing grain growth and leading to a reduced loss of surface area during crystallisation, and thereby a hexaaluminate powder having larger specific surface area.

Furthermore, by means of the inventive method the nanoparticles obtained exhibits a very narrow particle size distribution, which is believed to further enhance the obtainable specific surface area of the hexaaluminate.

Since sintering is suppressed, the material will thus exhibit enhanced thermal stability. The surface area of the powder is thus maintained better at high temperatures, even in the presence of water vapour.

The present method is offers a less expensive route to hexaalummates, since the water soluble metal salts, and especially the nitrates, generally are much cheaper than the corresponding alkoxides.

The method is also simplified since alkoxides are generally more difficult to handle. Furthermore, the alkoxides will generally have to be added to an organic solvent, since they are not water soluble, such for example the iso-propoxides.

In order to obtain an improved catalytic activity at extremely high temperatures, a portion of the aluminium alkoxide can be substituted by an equimolar amount of a water soluble salt of manganese. The manganese salt is then added to the water phase, together with the water soluble salt of the alkaline earth or rare earth metal.

The method can be used with any water soluble salt, such as chlorides or acetates.

Nitrates are suitably used in the method since the nitrate moiety is easy to strip from the precipitated powder, and are also generally readily available.

The use of a nitrate metal salt in the method also simplifies the substitution of manganese for lanthanum, since manganese nitrate is more readily available, than manganese alkoxides.

The metal salts used should preferably exhibit the same anion.

It is preferred that the solvent for the aluminium alkoxide and the solvent of the oil phase of the microemulsion to the same. More preferably, a solvent is selected which can readily be evaporated for recovery of the powder.

The sol-gel technique is well-developed for the preparation of high-surface area metal oxides. By combining the sol-gel technique with microemulsion-mediated synthesis, we have developed a method, which enables preparation of a nanostructured hexaaluminate material, and especially LHA, with high-temperature stability and enhanced resistance to sintering compared to hexaaluminate prepared by conventional techniques. A water-in-oil (w/o) microemulsion, sometimes referred to as a reverse microemulsion, contains well-dispersed and nanometer-sized water droplets of a narrow size distribution. The water-oil interface is stabilised by amphiphilic molecules (surfactant molecules). By using the droplets as nanoreactors, conventional water-based chemical reactions can be carried out in a well-defined and confined environment. This is known as microemulsion technique.

By using the microemulsion technique, the composition of the precipitate is controlled not only by the rates of precipitation, but also by the diffusion rate of each reacting component in the solvent phase. This feature, combined with the confined environment provided by the nanodroplets, enables synthesis of nanostructured materials. It is believed that the formation of hexaaluminate crystal structure at lower temperatures is favoured if the precipitate is well-mixed at nanometer level. Nanoparticles generally exhibit high reactivity, due to the high surface/volume ratio. Once the hexaaluminate phase has formed, further crystallite growth is slow, thereby leading to good high-temperature stability. In contrast, when conventional preparation techniques are used, higher temperatures are generally needed for crystallisation, leading to sintering of the material accompanied by loss of surface area.

The hexaaluminate is prepared by hydrolysis of an aluminum iso-propoxide solution, using a microemulsion containing, for example, metal nitrates in the aqueous phase. The gel is aged under stirring, during which hydrolysis and condensation occurs. Subsequently, the powder is recovered, dried and calcined.

In the examples below, lanthanum hexaaluminate powder (LHA, $LaA_{11}O_{18}$) is prepared. More specifically, the method involves the hydrolysis of an aluminium alkoxide, preferably aluminium iso-propoxide, using an aqueous solution of a water solule lanthanum salt, preferably lanthanum nitrate, added in the form of a water-in-oil microemulsion.

EXAMPLES 1–3

Powder Preparation

Two different solutions were prepared. Table 1 lists the chemicals that were used.

TABLE 1

| Substance | Chemical formula | Purity | Manufacturer |
|---|---|---|---|
| Lanthanum nitrate (hydrated) | $La(NO_3)_3 * 6 H_2O$ | 99.99 | Rhône-Poulenc |
| Aluminium iso-propoxide | $Al(OC_3H_7)_3$ | >98 | Alfa |
| Nonylphenol ethoxylate (NP-5; trade name: Berol 02) | $C_7H_{19}C_6H_4(OCH_2CH_2)_6OH$ | Industrial grade | Akzo Nobel Surface Chemistry |
| Cyclohexane | $C_6H_{12}$ | >99 | J. T. Baker |
| Distilled water | $H_2O$ | — | — |

The first solution consisted of approximately 15 wt % aluminium iso-propoxide ($Al(OC_3H_7)_3$) dissolved in cyclohexane (solution 1). The dissolution may be aided by ultrasonic treatment.

The second solution was a w/o microemulsion (solution 2) prepared from two different solutions.

First, a solution of lanthanum nitrate ($La(NO_3)_3*6H_2O$) in distilled water was prepared. In order to obtain the hexaaluminate phase it is important that the molar La/Al ratio is exactly 1:11. The stoichiometric water/—$OC_3H_7$ molar ratio is 0.5, i.e. the corresponding water/aluminium iso-propoxide ratio is 1.5. In the examples 1, 2 and 3, the water/aluminium iso-propoxide ratio was 10, 50 and 100, respectively, times the stoichiometrically required amount. Hence, the concentration of lanthanum nitrate in the aqueous solution used in the different examples varied depending on the specific water/alkoxide ratio used.

A solution of 20 wt % NP-5 in cyclohexane was then prepared. By adding the aqueous solution of lanthanum nitrate to the surfactant-solvent solution, a microemulsion was obtained. The amount of aqueous phase in the microemulsion was always kept at 10 wt %.

Precipitation was accomplished by slowly adding the solution of aluminium iso-propoxide in cyclohexane (solution 1) to the microemulsion (solution 2) under stirring. The mixture was aged under stirring for 48 h, during which hydrolysis and condensation took place. The ageing time may be increased or decreased.

Thereafter the precipitate was recovered by careful evaporation of the solvent in an oven at 75° C. in air. The boiling point of cyclohexane is 81° C. and this temperature must not be exceeded, as the solvent will start boiling violently.

Then the powder was calcined in air in a furnace. The temperature was increased at 2–5° C./min. The final temperature was chosen between 800 and 1200° C. and kept isothermal for 4 h.

The obtained calcined powders were characterised by X-ray diffraction (XRD) to determine the crystalline structure. Nitrogen adsorption-desorption at liquid nitrogen temperature according to the BET method was used to determine the specific surface area of the powders. The results are shown in Table 2.

TABLE 2

BET surface areas and crystal phases of prepared powders.
(calcination: 1200° C., 4 h; hydrolysis: 48 h;
surfactant system: NP5/cyclohexane)

| Ex. No | Water/alkoxide ratio (times stoich.) | BET surface area (m$^2$/g) | Predominant crystal phase* | Minority crystal phase(s). |
|---|---|---|---|---|
| 1 | 10 | 32.9 | LHA | LaAlO$_3$ |
| 2 | 50 | 35.1 | LHA | LaAlO$_3$ |
| 3 | 100 | 23.0 | LHA | LaAlO$_3$ |

*LHA = Lanthanum hexaaluminate

EXAMPLE 4

Figure 4:
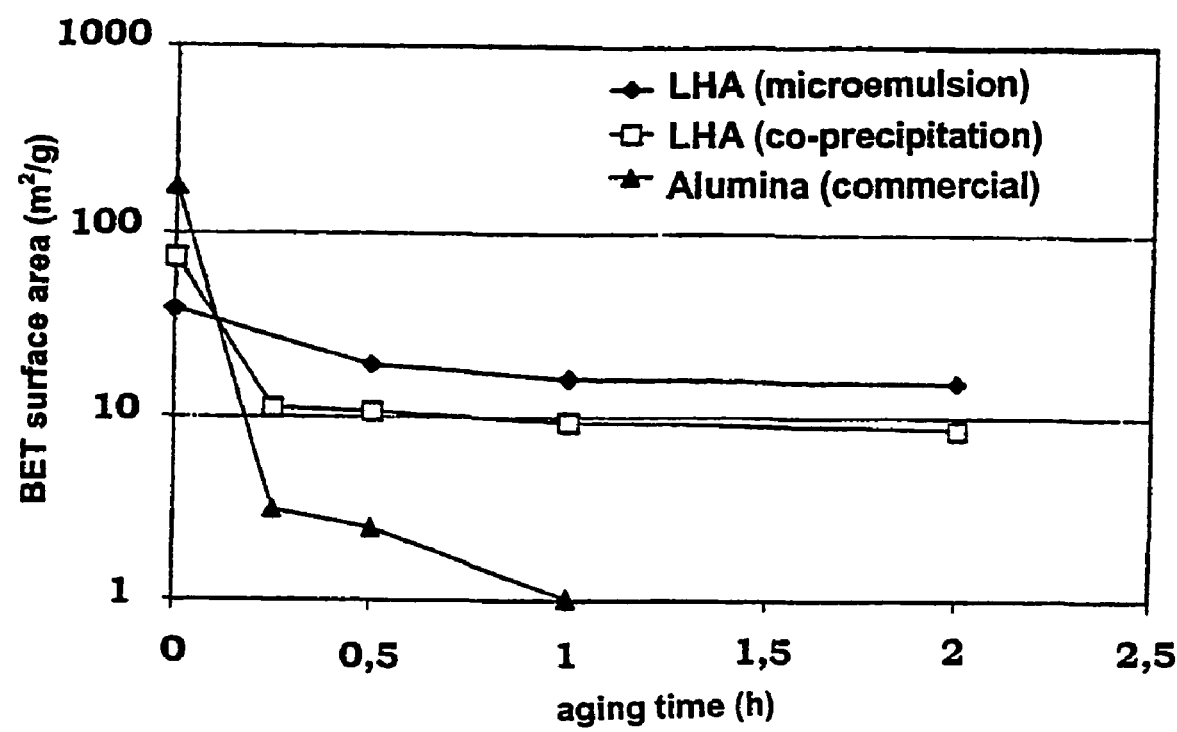
FIG. 4 shows the thermal stability of the LHA materials prepared in Examples 1–3 by combined sol-gel and microemulsion techniques are compared to those of conventionally co-precipitated LHA (co-precipitation of carbonates) and commercial alumina samples.

The thermal stability of the LHA materials prepared by combined sol-gel and microemulsion techniques was tested and compared to those of conventionally co-precipitated LHA (co-precipitation of carbonates) and commercial alumina samples. The tests were carried out under extreme conditions, i.e. 1400° C. and 60% steam, to simulate conditions similar to those prevailing in a rocket engine. The surface areas were measured by BET and crystal phases were determined by XRD. The results are shown in FIG. 4.

It can be seen that most of the surface area is generally lost within the first few minutes. After 15 minutes, the decrease is much less dramatic. This is probably due to phase transitions in the materials, as well as rapid sintering of the smaller pores. After about 1 hour, the surface area is almost constant for up to 10 hours. The lanthanum hexaaluminate (LHA) sample prepared according to the invention exhibited a surface area of 19 m$^2$/g after 30 minutes. This should be compared to 11 m$^2$/g of the LHA catalyst prepared by conventional carbonate co-precipitation and 3 m$^2$/g of the commercial alumina sample.

The choice of surfactant-solvent system greatly influences the droplet size in the microemulsion and the water solubilisation capacity. The surfactant may be ionic or non-ionic, contain branched or straight hydrocarbon chains etc. The solvent is generally chosen to match the hydrophobic tails of the surfactant molecules. We chose to work with NP-5/cyclohexane systems. NP-5 is a non-ionic surfactant containing five oxy-ethylene groups in the hydrophilic head group and a nonylphenyl group as the hydrophobic tail. Although the aluminium iso-propoxide is readily dissolved in other solvents, it is important to choose one, which is compatible with the microemulsion (solution 2). Hence, cyclohexane was used in the examples. AOT/isooctane could also be used. However, the AOT molecule has two branched hydrophobic tails and hence, this system has a significantly lower water solubilisation capacity due to the bulky tail group. In addition, there were indications that AOT is more difficult to remove for powder recovery. AOT is a solid at ambient temperatures, while NP-5 is in the liquid state. It should be noted that a large variety of different surfactant-solvent systems might be used.

In the above examples the amount of aqueous phase in the microemulsion was always kept at 10 wt % but may be decreased in order to obtain smaller water droplets.

The water/surfactant ratio in the microemulsion determines the water droplet size and affects the final particle size of the precipitate. Although small water droplets are generally desired, the amounts of surfactant and solvent needed increase drastically when reducing the droplet size, e.g. by a factor ten when reducing the aqueous content from 10 to 1 wt % in a system with constant surfactant/solvent ratio. The composition of the microemulsion is also limited by the compositional region in which the w/o microemulsion phase is stable. As is well known to the person skilled in the art of w/o microemulsions each system has its individual ternary phase diagram, which must be taken into account.

The water/alkoxide ratio affects the nucleation process and the size of the precipitated particles. The stoichiometric ratio of water/aluminium iso-propoxide is 1.5, but ratios in excess of stoichiometry are generally used, as rapid precipitation, i.e. small particles, is desirable.

The ageing time will also affect the properties of the precipitated particles.

It is important to maintain the unique, discrete properties of the particles upon recovery. The final powder morphology is very much a result of the recovery step. There are several possible methods for recovery of the precipitate, which could be used, such as filtration, centrifugation, temperature induced phase separation, chemical destabilisation, evaporation of the solvent, supercritical drying and freeze drying. Although conceivable, centrifugation and filtration are not believed to be of any practical value, due to the extremely small particle size. The method of highest practical value is presently considered to be evaporation of the solvent.

Parameters such as atmosphere, heating rate, final temperature and duration of the calcination treatment all influence the properties of the final product.

Preferred Method of Preparing Pellets of 0.2–5 mm in Diameter for the Catalyst Bed of the Reactor.

By means of the following inventive method spherical pellets of 0.2–5 mm can be prepared from a catalyst material having a high sintering resistance, such as the hexaaluminate material described above, and/or containing a sintering inhibiting agent, without the use of any conventional mould.

According to the method spherical pellets are prepared from a slurry comprising a catalyst material, a solvent, and any desired additives, by means of a drop-generating orifice to which said slurry is fed. In the method, the thus-formed drops are released from said orifice by means of a relative flow of a liquid medium, and formed into spherical bodies in said liquid medium by means of the action of surface tension, and thereafter treated for consolidation by a suitable direct casting method. Preferably, the slurry also contains a consolidating agent. The consolidated drops are dried, and thereafter any consolidating agent and/or organic fillers contained in the slurry are burned-out, and the bodies sintered.

By using a catalyst material having a high sintering resistance and/or containing a sintering inhibiting agent, pellets having a sub-micron range porosity can be obtained, which pellets maintain the desired area, or only slowly degrade in their desired area at a high temperature. The pellets thus formed will also maintain their geometry when subjected to high temperatures, also when exposed to relevant fluids, under such temperatures.

The diameter of the pellets can be closely controlled by regulating the relative flow rate of the liquid medium, and the feed pressure of the slurry. By means of the method spherical pellets of a controllable, uniform size can be prepared.

As examples of desired additives which can be used in the slurry, the following can be mentioned: dispersants, defoamers, binders, fillers, consolidating agents, and processing aids etc.

When a particulate organic filler, such as in the form of fibres or particles, and/or a particulate consolidating agent is used in the slurry, the pellets prepared according to the present method will generally exhibit some residual porosity from the burnout of the filler and/or consolidating agent used.

It is also conceivable to use a fibrous or particulate filler, optionally in addition to a consolidating agent, which filler can be removed by means of burn-out, in order to create pores in the pellets, corresponding to the geometrical shape of the filler after burn-out thereof.

Accordingly, if desired, the amount of consolidating agent can be increased above the amount necessary for consolidation, in order to obtain open porosity in the pellets after burn-out of the consolidating agent. A filler which can be burned-out can also be used for the same purpose. The size of the pores can then be regulated by means of the particle size of the consolidating agent and/or filler.

In a preferred embodiment starch is used as consolidating agent.

According to the present method, a relative flow of a liquid medium means that slurry enters into a flow of liquid medium, or into a stationary liquid medium, in which case the opening described a movement relative to the liquid medium is moved back and forth, or in a circle, for example, relative to the stationary medium.

The direction of the relative flow of the liquid medium is not critical and can vary from being coincidental with direction of formation of the drops, to essentially perpendicular to the direction of formation of the drops, the former of which is presently being preferred In order to establish the action of surface tension, which is believed to be the principal driving force underlying the forcing of the released drops to assume a spherical shape, a liquid medium which is a poor solvent for the solvent of the slurry is preferably selected. This desired effect will be enhanced by selecting a medium which is immiscible with the solvent of the slurry. In any case, the liquid medium should be effective to force the released drops to minimise their surface area.

The spherical drops thus formed are then treated for consolidation, in accordance with the specific consolidation method, drying, burn-out of any filler and/or consolidating agent used, and sintering.

By performing the sintering step under pressure-less conditions, i.e. without the use of a mould, the pellets will exhibit a macro-porosity depending on the specific consolidating agent used and/or filler, and more particularly the particle size and shape thereof.

For a given slurry and given diameter of the opening, the size of the pellets can be closely controlled by regulating the relative flow rate of the liquid medium, and the feed pressure of the slurry. Other factors that will affect the pellet sizes obtainable are primarily the viscosity of the slurry, the density of the slurry, and the diameter of the opening.

Any suitable consolidating agent can be used in the present method. The consolidating agent will of course be dependent on the desired method of consolidation. Suitable consolidating agents and consolidation methods, respectively, are;

starch—starch consolidation,
protein—protein coagulation,
polymer—gel casting (from monomers, or polymers which are cross-linked, and
solvent of the slurry—freezing.

The term direct casting as used in the present application is generally defined as the process of transforming an amount of slurry into a rigid body, and is intended to embrace such methods wherein a consolidating agent is used. The terms direct casting and consolidation will be used interchangeably.

Suitably examples of direct casting method are described by Wolfgang M. Sigmund et al in "Novel Powder-Processing Methods for Advanced Ceramics", *J Am Ceram Soc,* 83 [7] 1557–74 (2000), which is incorporated by reference herein in its entirety In a preferred embodiment of the inventive method, starch is used as consolidating agent.

For the purpose of regulating the size of the macro pores resulting from burn-out in the pellets, starch is a very suitable, and can also perform the function of a consolidating agent. The average size of the starch particles generally ranges from 2–100 µm depending on from which plant the starch is derived.

Thus, for example, the consolidating amount of starch could be of one size, and additional starch particles added in order to obtain an open porosity could be of another size. It is also conceivable that suitable starch addition will reduce the density of the obtained pellets without accomplishing an open continuous porous structure The design of the apparatus used to form the drops or droplets is riot critical, and can be of any design as long as drops can be produced.

It is preferred that the drops formed be treated for consolidation as possible after having attained spherical shape. This can be done by discharging the drops from the apparatus directly into a suitable medium for consolidation. In for example the case of polymers, starch and protein requiring heating for consolidation, the medium, such as a liquid, is heated to consolidation temperature. Other means of heating the drops are of course also possible, such as a heated gas medium or microwave radiation. In order to obtain spherical droplets, the droplets must have enough time to become spherical, by the force of surface tension, before the solidification temperature is reached in the droplets, as this will lock the current geometry.

In the case of consolidation by means of freezing of the solvent of the slurry, a cold medium is used instead.

In the method of the invention, an apparatus according to the following can be used, for example. A suitable apparatus in its most simple embodiment can be based on the following general components. An opening (i.e. drop-generating orifice), such as the opening of a small tube or cannula, from which opening drops are released or ejected, and to which cannula a slurry to be consolidated is fed. The drops are then forced to separate from the opening, by means of the flow of a liquid medium acting on the slurry ejected from the opening. A suitable flow can for example be achieved by means of a cannula, displaced in a tube, in which tube the liquid medium flows. The drop formed at the opening of the cannula will the be entailed by the liquid flow and attain its spherical shape. The flow of liquid medium with entailed drops can for example be discharged into a tank containing the liquid. Depending on the specific method of consolidation, said tank can for example be heated in order for consolidation of to take place. Liquid can then be recirculated from the tank to the tube, optionally after cooling thereof.

After consolidation, the pellets are preferably dried before burn-out of any consolidating agent and/or filler, in order to prevent disintegration of the pellets during the burn-out, due to rapid build up of any vapour inside the bodies.

It is generally desirable that the catalyst pellets exhibit an as great as possible specific surface area, in order to maximise the catalytic surface area. In this case it is of a great advantage to use a ceramic material having a high resistance to sintering at high temperatures, such as the above-mentioned hexaaluminate. Preferably, such powder has a narrow particle size distribution. Thereby, pellets having a fine (sub-micron range) porosity, such as in the range of 100–200 nm, can be obtained. By using a higher amount of consolidating agent in the slurry than necessary for consolidation, an open macro-porous structure can be obtained, formed by the pores resulting from burned-out particles of consolidating agent and/or filler in the pellets. Thereby, an increased fraction of the nano-porous structure will be available to catalysis, and thus the pellets will exhibit a substantially increased effective catalytic surface area.

Such an open porosity will also reduce the flow resistance posed by the pellets, when contained in a catalytic bed, for example. Also, the risk for vapour induced disintegration of the pellets could be reduced, since any vapour formed in the pores by liquid that has penetrated into the pellet more easily can escape from the structure by means of an open porosity.

By means of varying the amount of consolidating agent (or filler which can be burned-out), and thereby the extent of the open porosity, pellets can be prepared offering a controlled pressure resistance, when contained in a catalyst bed for example.

According to a preferred embodiment of the method of the present invention, drops are formed from a slurry containing a suitable ceramic catalyst powder, starch as the consolidating agent, optionally a dispersant, and water, which drops thereafter are heated for swelling of the starch, such as, for example, by being heated in a liquid medium. The slurry can also contain other organic constituents and solvents or dispersing media or liquids, as long as an amount of water sufficient for effecting swelling is present. Naturally, a liquid medium for the forming of the drops must be selected that does not disturb the function of the constituents of the slurry.

During heating to elevated temperatures, the starch pellets will absorb water from the slurry and swell, thereby forming rigid bodies, which can be collected and dried. During the swelling, the consolidated bodies are preferably allowed to consolidate (solidify) freely, i.e. without the use of a mould. The dried bodies are thereafter heated at higher temperatures in order to remove the starch through a burn-out, and finally sintered at even higher temperatures to achieve a material with sufficient strength and hardness. The macro-porosity remaining in the material after sintering will generally correspond to the amount and type of starch pellets used in the slurry, and the ability of the ceramic matrix to densify, the latter of which generates the micro-porisity.

The shape, size and swelling temperature of the starch granules depends on the specific starch type. Among the most common starches for commercial uses, potato starch swell at 50–55° C., corn and rice starch at 60–75° C. Examples of other varieties of starch which can be used in the invention are those obtained from the seeds of cereal grains, such as sorghum and wheat, also from certain roots, such as tapioca, cassava and arrowroot, and from the pitch of the sago palm. The mean granule size is 55 μm for potato starch, 10–15 μm for corn starch and 5 μm for rice starch. The size of the starch used is not critical and can be selected based on the specific purpose and the desired size of the pores. The starch can be in native form or in chemical modified form. For example, the starch can be modified by etherification to make it more stable towards mechanical treatment and acidic conditions.

The present pellet forming method will now be described in more detail with reference to the following examples.

EXAMPLE 5

Preparation of spheres from a slurry containing an amount of starch effective for consolidation of the drops.

The constituents used are listed below:

| Constituent | Designation/Manufacturer | Percentage |
| --- | --- | --- |
| Aluminium oxide powder | AKP30/Sumitomo, Japan | 35 vol % (solids content) |
| Dispersant | Duramax D-3021/Rohm and Haas France S.A., France | 1.0% by weight based on powder |
| Liquid | Distilled water | Balance |
| Starch | Mikrolys 54, 1.43 g/cm$^3$/ Lyckeby Stärkelse AB, Sweden | 5% by vol. based on powder |

The ceramic powder used in the example was aluminium oxide. The oxide was first dispersed in water together with the dispersant by ball milling. Then the starch was added during mixing by means of a propeller. In this case a chemical modified and size-fractionated potato starch with a mean pellet size of 20 μm was used. Thereafter the slurry obtained was forced into a cannula with an inner diameter of 0.3 mm, which was inserted into a polyethylene tube with an inner diameter of 3.5. The liquid heating medium was circulating in the polyethylene tube and the flow forced the drops to be released (at a premature stage) from the opening of the cannula. By changing merely the flow velocity of the liquid heating medium, the size of the drops could readily be varied between 0.5 and 1.5 mm. The liquid heating medium used, in which the spheres are consolidated, was liquid paraffin (KeboLab, item No. 13647-5), and was kept at an elevated temperature of 60–70° C.

The consolidated pellets were collected and dried in air at about 50° C. Thereafter the spheres were burned out at 500° C. and sintered at 1600° C., for 30 minutes in air. The heating ramps used were 1° C./min up to 500° C. and 5° C./min up to the sintering temperature.

EXAMPLE 6

Preparation of spheres from a slurry containing an amount of starch effective for consolidation of the drops.

The constituents used in the example are listed below:

| Constituent | Designation/Manufacturer | Percentage |
|---|---|---|
| Hexaaluminate powder | LaAl$_{11}$O$_{18}$, from emulsion/ Kemisk Teknologi, KTH, Sweden | 30 vol % (solids content) |
| Dispersant | Duramax D-3021/Rohm and Haas France S.A., France | 1.0% by weight based on powder |
| Liquid | Destillerat vatten | Balance |
| Starch | Mikrolys 54, 1.43 g/cm$^3$/ Lyckeby Stärkelse AB, Sweden | 5% by vol. based on powder |

The ceramic powder used in the example was lanthanum-hexaaluminate prepared in Examples 1–3.

The calcined powder was amorphous and had a very fine particle size and exhibited a specific surface area of 280 m$^2$/g. However, using such a fine powder, slurries of sufficiently high solids content are difficult to reach. Therefore, the powder was additionally calcinated at 1200° C. during 4 hours in air. At this temperature the powder is transformed into a crystalline phase and the specific surface area is reduced to 30–35 m$^2$/g.

A slurry was prepared based on the constituents enumerated above. Thereafter the slurry obtained was forced into a cannula with an inner diameter of 0.3 mm, which was inserted into a polyethylene tube with an inner diameter of 3.5 mm. The liquid heating medium was circulating in the polyethylene tube and the flow forced the drops to be released (at a premature stage) from the opening of the cannula. By merely changing the flow velocity of the liquid heating medium, the size of the drops could readily be varied between 0.5 and 1.5 mm. The liquid heating medium used, in which the spheres are consolidated, was liquid paraffin (KeboLab, item No. 13647-5), and was kept at an elevated temperature of 60–70° C.

The consolidated pellets were collected and dried in air at about 50° C. There after the spheres were sintered at 1200, 1300 and 1400° C., respectively, for 30 minutes in air. The heating ramps used were 1° C./min up to 500° C. and 5° C./min up to the sintering temperatures.

The pellets obtained after sintering were spherical, and exhibited a very smooth surface, and a high side crush strength. The porosity was found to be binomial, with the larger pores resulting from the consolidating agent particles, and the finer porous structure, 100–200 nm, resulting from the specific ceramic powder used. The pellets were found to be resistant up to temperature of at least 1700° C.

In examples 7 and 8, different catalytic metals impregnated by incipient wetness on the pellets prepared in Example 6 were tested in an experimental 1 N class rocket engine, according to the present invention.

EXAMPLE 7

Iridium on Lanthanum Hexaaluminate Catalyst

The rocket engine was test-fired with a catalyst consisting of 3.2% iridium deposited on lanthanum hexaaluminate pellets prepared in Example 6. The reactor was preheated to 300° C. The engine was test-fired with a propellant blend consisting of about 64.3% ammonium dinitramide, about 24.3%-water and about 11.4% by weight of methanol, with and without stabiliser (0.5% urea). The combustion temperature was measured with a thermocouple. A nearly adiabatic exothermic reaction temperature was measured at each firing.

EXAMPLE 8

Platinum/Rhodium on Lanthanum Hexaaluminate Catalyst

An experimental 1 N class rocket engine, built according to the present invention was test-fired with a catalyst consisting of 9.4% platinum/Rhodium deposited on a high-surface area lanthanum hexaaluminate pellets prepared in Example 6. The reactor was preheated to 300° C. The engine was test-fired with a propellant blend consisting of about 64.3% ammonium dinitramide, about 24.3% water and about 11.4% by weight of methanol (in the following called LMP-103). The combustion temperature was measured with a thermocouple. The combustion temperature was measured with a thermocouple. A near adiabatic exothermic reaction temperature was measured at each firing.

EXAMPLE 9

Figure 5:
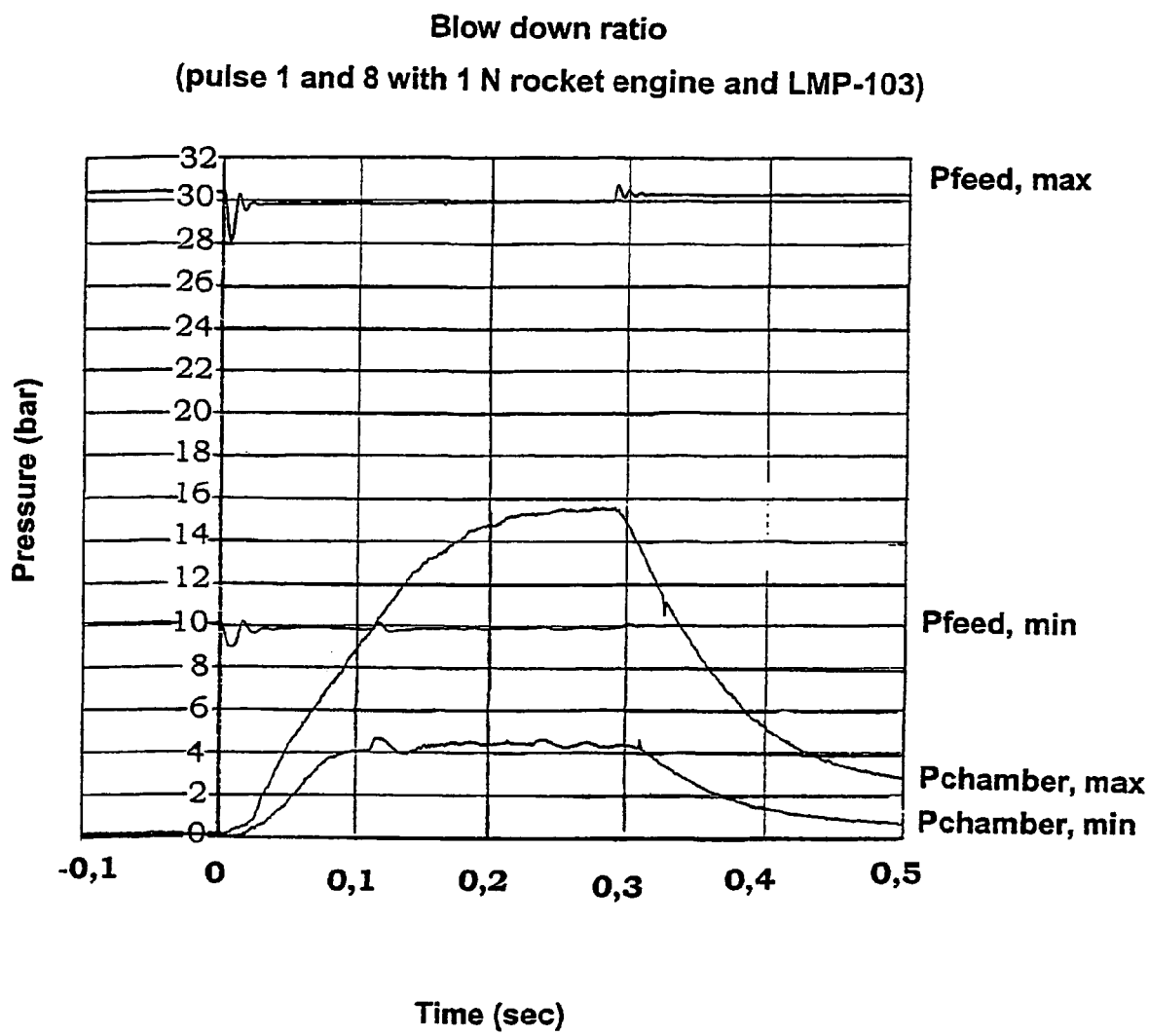
FIG. 5 illustrates pressure traces from 2 test firings with LMP-103 in an experimental breadboard rocket engine of the present invention.

In this example two test firings using LMP-103 in a 1 Newton experimental breadboard rocket engine of the present invention were performed. FIG. 5 shows the pressure traces from the propellant feed system and the rocket engine combustion chamber, during the two test firings of 0.3 sec duration each under vacuum conditions. The figure also demonstrates three essential characteristics; Rapid ignition, Stable combustion, and Blow-down capability.

A number of experimental rocket engines according to the invention have been built and tested by firing of more than 100 pulses with durations between 0.1 and 50 s. In addition to the functions described above, complete combustion, and thus high specific impulse, and sustained reactor functionality after numerous thermal cycles have also been achieved.

Suitable examples of ADN-based monopropellants which can be used in the process of the invention are those described in WO-0050363.

Preferred Monopropellants for Decomposition in the Reactor

Preferred examples of ADN-based monopropellants, which can be used in the process of this invention, are the above-mentioned propellants, to which a base has also has been added as a combustion stabilising agent.

By addition of the stabilised combustion characteristics are obtained. An improved storage life, i.e. stability to storage under elevated temperatures, is also achieved by means the addition of the base according to the propellant.

The base used as a combustion stabilising agent must be a base weaker than ammonia, or a base that is sterically hindered. This is in order to prevent the NH$_4^+$ cation from escaping from the propellant in the form of ammonia, thereby leaving the dinitramide anion balanced by other cation species. As a consequence, the solubility characteristics of any constituents could possibly also be altered, and there could be a risk of any undesired precipitation. Examples of such bases are: hydrazine, hydroxylamine, urea, ethyleneimine, allantoin, pyridine, 2-, 3-, and 4-methylpyridine, 2- and 4-pyridineamine, 2,5-pyridinediamine, 2,3-, 2,4-, 2,5-, 2,6-, 3,4-, and 3,5-dimethylpyridine, 2-ethylpyridine, 2,4,6-trimethylpyridine, 4,6-dimethylpyrimidinamine, methoxypyridine, imidazole, 2,4-dimethylimidazol, quinoline, naphtylamine, N,N-dimethylcyclohexylamine, N-ethyldiisopropylamine and hexamethylenetetramine (hexamine). It is preferred that the base used should not be prone to separate from the propellant, such as by evaporation.

The base is added in an amount of 0.1 to 5% of the total weight of the other components of the monopropellant, more preferably 0.5–3%, and most preferably in an amount of about 0.5–1%.

The presently most preferred bases is hexamine and urea, of which the latter is more preferred.

Especially preferred fuels are represented by methanol, ethanol, acetone, glycine, and glycerol, of which methanol and glycerol are more preferred. Methanol is the most preferred fuel in the stabilised propellant.

More specifically, a preferred propellant composition according the invention containing water, and fuel, exhibits a composition ranging from 15 to 55% by weight of the fuel in solvent mixture (solvent mixture=water+fuel), and a more preferred composition from 10 to 50% by weight of fuel in solvent mixture, and even more preferably, 25 to 45% by weight of fuel in solvent mixture, to which a stabiliser is added in an amount of 0.1 to 5, and more typically 0.5–3%, preferably 0.5–1%, and most preferably 0.5%, based upon the total weight of the other components.

Accordingly, the most preferred monopropellants are stabilised compositions of ADN, water, and glycerol, or ADN, water, and methanol.

In the case of methanol, a composition consisting of about 64.3% ammonium dinitramide, about 24.3% water and about 11.4% by weight of methanol (also referred to as LMP-103), to which a stabiliser is added in the above mentioned amount, is especially preferred.

In the case of glycerol, a composition of about 61.0% of ADN, about 26.1% of water, and about 12.9% by weight of glycerol (also referred to as LMP101), to which composition a stabiliser is added in the above mentioned amount, is especially preferred.

The above methanol composition is the most preferred

In order to prolong the catalyst life time, pure propellants should be used so that poisoning of the catalyst is avoided. It is therefore preferred that the monopropelllant, and notably the AND used should be of highest possible purity. For example, contaminants in the form of non-volatile residues, such as for examples iron, potassium and chlorine, should be kept low, such as no more than 50 ppm by weight, more preferably no more than 1 ppm by weight.

Since many of the catalytic metals used according to the present invention are known to be suitable catalysts also for other propellants, such as, for example, propellants based on hydroxylammonium nitrate (HAN), the reactor of the invention could also conveniently be used for the controlled decomposition of such propellants.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims.

The invention claimed is:

1. A reactor for decomposition of a liquid ammonium dinitramide-based monopropellant into hot, combustible gases, comprising a hollow body (5) provided with, from the upstream end;
    an injector (20);
    a heat bed (25); and
    a catalyst bed (30) of porous catalyst pellets (35) which are heat resistant up to a temperature of at least 1000° C.,
    wherein the injector is formed so as to be able to distribute the liquid propellant over the heat bed, the overall void volume is essentially formed of the porosity of the heat bed and catalyst bed, and wherein the hollow body is thermally conductive and the heat bed is in indirect thermal contact with the catalyst bed via the hollow body.

2. The reactor of claim 1, wherein the downstream portion of the catalyst bed is sintering resistant up to a higher temperature.

3. The reactor of claim 2, wherein the downstream portion of the catalyst bed is sintering resistant up to 1200° C.

4. The reactor of claim 2, wherein the downstream portion of the catalyst bed is sintering resistant up to 1400° C.

5. The reactor of claim 2, wherein the downstream portion of the catalyst bed is sintering resistant up to 1700° C.

6. The reactor of claim 1, wherein the injector has the properties of a heat bed.

7. The reactor of claim 1, wherein the pellets comprise an alumina material.

8. The reactor of claim 7, wherein the alumina material is hexaaluminate $AA_{11}O_{18}$, wherein A is an alkaline earth or rare earth metal.

9. Reactor of claim 8, wherein the $AA1_{11}O_{18}$, is obtained by adding a solution of an aluminium alkoxide to a water-in-oil microemulsion, the aqueous phase of which comprises a solution of a water soluble salt of A, whereafter the powder formed is recovered and calcined.

10. The reactor of claim 8, wherein A is La.

11. Reactor of claim 1, wherein the material comprising the pellets contains the dopant Mn.

12. Reactor of claim 1, wherein the pellets are impregnated with a catalytically active metal component selected from Pt, Ru, Pd, Pt/Rh, Ir, Rh, Mn or Ir/Rh.

13. Reactor of claim 1, wherein the pellets are prepared from a slurry comprising the catalyst material, a solvent, and any desired additives, by means of a drop-generating orifice to which said slurry is fed, from which orifice the drops are released by means of a relative flow of a liquid medium, and formed into spherical bodies in said liquid medium by means of the action of surface tension, and thereafter treated for consolidation.

14. A rocket engine for ammonium dinitramide-based liquid monopropellant, comprising
    a reactor for decomposition of a liquid ammonium dinitramide-based monopropellant into hot, combustible gases, comprising a hollow body (5) provided with, from the upstream end;
    an injector (20);
    a heat bed (25); and
    a catalyst bed (30) of partial catalyst pellets (35) which are heat resistant up to a temperature of at least 1000° C.,
    wherein the injector is formed so as to be able to distribute the liquid propellant over the heat bed, the overall void volume is essentially formed of the porosity of the heat bed and catalyst bed, and wherein the hollow body is thermally conductive and the heat bed is in indirect thermal contact with the catalyst bed via the hollow body; and
    a combustion chamber (50) having a combustion chamber void volume,
    wherein the total void volume of said rocket engine is essentially formed of the overall void volume of the porosity of the heat bed and catalyst bed, and the combustion chamber void volume.

15. The rocket engine of claim 14, wherein the porous catalytic material has been dimensionally pre-stabilised at expected operational temperature.

16. The rocket engine of claim 14, wherein the size of the pellets is about one tenth of the inner diameter of the hollow body (5).

17. The rocket engine of claim 14, wherein the combustion chamber (50) is lined with iridium (60).

18. Rocket engine of claim 14 having a thrust of 0.5 N to 1 kN.

19. The rocket engine of claim 14, wherein the porous catalytic material has been dimensionally pre-stabilised at 50° above the expected operational temperature.

20. The rocket engine of claim 14 having a thrust of 0.5 N to 50 N.

21. A process for decomposition of a liquid ammonium dinitramide-based monopropellant, comprising the steps of:
(A) subjecting a liquid ammonium dinitramide-based monopropellant to a temperature efficient for essentially bringing the propellant into the vapour phase and decomposing the dissolved ammonium dinitramide into gaseous compound;
(B) bringing the essentially vaporised monopropellant into contact with a porous catalytic material for decomposition of the monopropellant into hot, gaseous combustible components; and, optionally
(C) combusting the combustible components; and
wherein heat generated from step (B) and/or (C) is used for vaporising the liquid monopropellant in step (A).

22. Process of claim 21, wherein the vaporisation of the monopropellant in step (A) is sufficient for preventing vapour induced disintegration of the porous catalytic material.

23. Process of claim 21, wherein a stabilised liquid dinitramide-based monopropellant is decomposed.

* * * * *